United States Patent [19]

Nagatsuma et al.

[11] Patent Number: 4,884,327
[45] Date of Patent: Dec. 5, 1989

[54] BOOT ASSEMBLING APPARATUS FOR DRIVE SHAFT

[75] Inventors: Nobuyoshi Nagatsuma; Yoshiharu Kamata, both of Sayama, Japan

[73] Assignee: Honda Giken Kogyo Kabushiki Kaisha, Tokyo, Japan

[21] Appl. No.: 323,712

[22] Filed: Mar. 15, 1989

[30] Foreign Application Priority Data

Mar. 18, 1988 [JP] Japan ................................. 63-65539

[51] Int. Cl.$^4$ .............................................. B23P 19/02
[52] U.S. Cl. ........................................ 29/235; 29/237
[58] Field of Search ................. 29/256, 238, 237, 235, 29/283, 450, 252, 282; 277/1, 9.5, 11

[56] References Cited

U.S. PATENT DOCUMENTS

| | | | |
|---|---|---|---|
| 3,393,440 | 7/1968 | Wilson | 29/235 |
| 3,710,693 | 1/1973 | Marhold | 29/235 |
| 4,564,988 | 1/1986 | Norrod | 29/235 |
| 4,815,187 | 3/1989 | Rettig et al. | 29/235 |

*Primary Examiner*—Robert C. Watson

*Attorney, Agent, or Firm*—Armstrong, Nikaido, Marmelstein, Kubovcik & Murray

[57] ABSTRACT

A jig body on an assemlbing jig is vertically aligned with the shaft upon which the boot is to be mounted and is movable forward and away from the shaft along an axial line thereof. A seat mounted on the leading end of the jig body receives an inner end face of the boot. A guide sleeve mounted on the jig body projectable forward of the seat is normally retained forcibly forward of the seat predetermined length approximately equal to the length of the bead and is shaped to be fitted over the shaft and into the bead of the boot. A guide shaft mounted in the guide sleeve is slidable axially rearward relative to the sleeve and is shaped to abut against and center the end face of the driving shaft. A push rod is inserted in the jig body for urging the guide shaft axially forwardly. The push rod is provided with a restricting portion for restricting the axially forward sliding stroke of the guide sleeve to a predetermined extent. A first cylinder urges the jig body forward axially. A second cylinder is mounted on the piston rod of the first cylinder and is arranged to reciprocate the push rod.

3 Claims, 4 Drawing Sheets

FIG.4
FIG.5(a) FIG.5(b)
FIG.5(c) FIG.5(d)
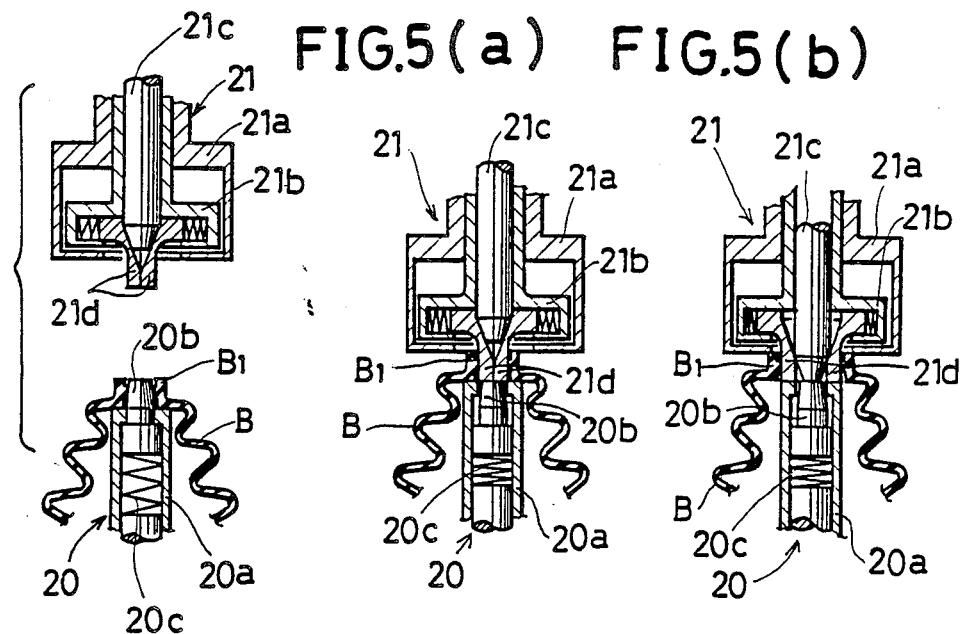
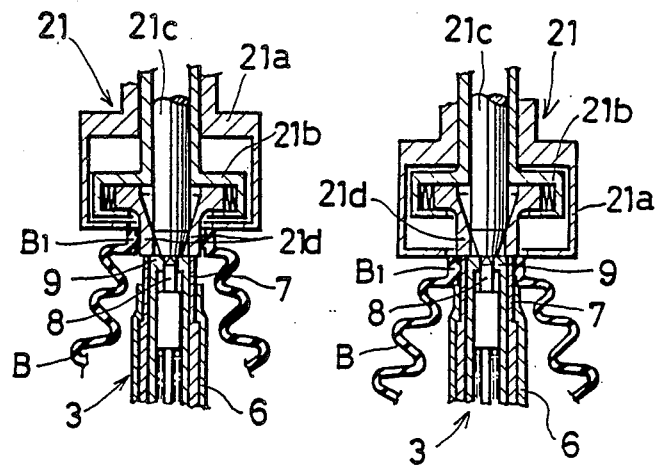

BOOT ASSEMBLING APPARATUS FOR DRIVE SHAFT

BACKGROUND OF THE INVENTION

The present invention relates to a boot assembling apparatus for use in a process for assembling a shaft such as a driving shaft for a vehicle by attaching thereto a joint unit such as a constant velocity joint, and more particularly, to an apparatus for assembling a boot for a joint unit or the like to the shaft, the boot having a bead at its leading end adapted to be fitted over the shaft.

An assembling apparatus for the above function has conventionally been known from Japanese Patent Application Laid-open No. 246432/87. An assembling jig is positioned coaxially with the shaft and has a jig body movable toward and away from the shaft in an axial direction of the shaft. A seat is mounted on a leading end of the jig body for receiving an inner end face of the bead of the boot, and a plurality of radially openable and closable claw pieces are mounted on an inner periphery of the seat as to be projectable forwardly of the seat. In this apparatus, the boot is set on the assembling jig so that the claw pieces may be inserted into the bead of the boot while remaining closed and held projecting forwardly of the seat. Then, the claw pieces are opened to clamp the bead and diametrically expand it. In this condition, the jig body is advanced toward the shaft to have an end of the shaft inserted between the claw pieces. The claw pieces are then sunk into the seat when the jig body has been advanced to a given position. This sinking operation results in withdrawal of the claw pieces from the bead seated on the seat, thus having the bead fitted over a predetermined portion of the shaft.

The foregoing apparatus is structurally rather complicated, in that a mechanism for opening and closing the claw pieces is required to be incorporated in the assembling jig. Therefore, it is being considered that in place of the claw pieces, a guide sleeve which can be fitted over the shaft may be mounted on the jig body and projectable forwardly of the seat, so that, for setting a boot on the assembling jig, the bead held in a diametrically expanded state can be fitted over the guide sleeve projecting from the seat.

In the apparatus described in the above publication, a cylinder is provided on the jig body for projecting and retracting the claw pieces, apart from a drive source for reciprocating the jig body. In such an apparatus equipped with the cylinder for providing the projection and retraction of the claw pieces, even if the claw pieces were replaced by the guide sleeve as described above, the assembling jig would still be structurally complicated and large-sized. Therefore, it is desired that the drive source for projecting and retracting the guide sleeve be integrally incorporated in the drive source for reciprocating the jig body to provide a reduction in size and a simplification of the assembling jig. Therefore, it is a first object of the present invention to solve the foregoing problem.

In addition, if the assembling jig and the shaft are out of center alignment with each other, the guide sleeve interferes with the shaft when the jig body is advanced, consequently making it impossible to assemble the boot to the shaft. Therefore, it is a second object of the present invention to remove such inconvenience.

Further, in the above mechanism, the jig body is advanced to a predetermined position to fit the bead of the boot over the shaft and hence, if the shaft is out of the axially aligned position, the bead cannot be fitted over the predetermined portion of the shaft. Accordingly, it is a third object of the present invention to solve such problems.

SUMMARY OF THE INVENTION

To attain the first and second objects, the present invention provides a boot assembling apparatus for assembling a boot to a shaft, the boot being provided at its leading end with a bead adapted to fit over the shaft. An assembling jig is positioned to be axially aligned with the shaft and has a jig body movable toward and away from the shaft in an axial direction of the shaft. A seat is mounted on a leading end of the jig body for receiving an inner end face of the bead of the boot. A guide sleeve is mounted in the jig body to be projectable forwardly of the seat, and is normally retained forcibly in a state in which it remains projecting forwardly of the seat for a predetermined length approximately equal to that of the bead. The guide sleeve is adapted to be fitted over the shaft and into the bead of the boot. A guide shaft is mounted in the guide sleeve slidable axially rearwardly relative to the guide sleeve. The guide shaft is adapted to abut against an end face of the shaft for centering the shaft. A push rod is inserted in the jig body for urging the guide shaft axially forwardly and is provided with a restricting portion for restricting the axially forward sliding stroke of the guide sleeve to a predetermined extent. A first cylinder is provided for urging the jig body axially forwardly. A second cylinder is mounted on a piston rod of the first cylinder, so that the push rod is reciprocated by the operation of the second cylinder.

Further, to attain the third object, the invention provides the boot assembling apparatus, wherein a third cylinder is attached to the piston rod of the first cylinder located axially rearwardly of the second cylinder. A piston rod of the third cylinder is projectable into the second cylinder, so that the axially forward moving stroke of the piston rod of the first cylinder relative to the piston of the second cylinder may be restricted to a predetermined extent by abutment of the piston rod of the third cylinder against the piston.

In addition, to attain the third object without using the foregoing third cylinder, the invention is such that the axially forward moving stroke of the piston rod of the first cylinder relative to the piston of the second cylinder may be restricted to a predetermined extent by abutment of an axially rear cylinder end of the second cylinder against the piston. The restricting portion is arranged so that the axially forward sliding stroke of the guide sleeve relative to the guide shaft may be shorter than the moving stroke by the predetermined length of guide sleeve projecting from the seat.

Operation of the above apparatus is as follows. First, the boot is set in the assembling jig in such a manner that the guide sleeve is inserted into the bead thereof, and the first cylinder is then operated to urge and move the jig body axially forwardly.

During this time, the guide sleeve is moved axially forwardly in unison with the jig body, and the guide shaft is also moved following the jig body. Consequently, the guide shaft first abuts against the end face of the shaft, so that the shaft is centered relative to the assembling jig, and further axially forward movements of the guide shaft and the push rod are restricted. Thereafter, only the jig body and the guide sleeve are urged and moved axially forwardly, and the guide sleeve is fitted over the shaft.

When the guide sleeve has reached the fitting portion of the shaft where the bead is to be fitted over the shaft, the forward movements of the jig body and the guide sleeve are stopped. Then the operation of the second cylinder causes the push rod to be moved axially rearwardly so as to pull the guide sleeve axially rearwardly relative to the jig body through the restricting portion.

This causes the guide sleeve to be sunk into the seat at the leading end of the jig body and withdrawn from the bead seated on the seat. Thus, the bead fits over the fitting portion of the shaft by its own resilient force.

Now, when the guide shaft comes to abut against the end face of the shaft and a further movement thereof is thus restricted, the piston rod of the second cylinder connected to the guide shaft through the push rod is also held to remain at a fixed position relative to the end face of the shaft. Thereafter, the piston rod of the first cylinder is moved relatively axially forwardly with respect to the piston rod of the second cylinder. In this case, when the piston rod of the first cylinder has moved for a predetermined stroke with respect to the piston rod of the second cylinder, the piston rod of the third cylinder projecting into the second cylinder abuts against the piston of the second cylinder to stop the movement of the piston rod of the first cylinder and consequently the urged movement of the jig body and the guide sleeve.

Thus, the guide sleeve is stopped at a position a predetermined amount of stroke away from the shaft end surface which serves as the reference surface having a given positional relationship with the piston of the second cylinder, so that even when the shaft is out of axial alignment, the guide sleeve can be reliably stopped at the bead fitting portion the predetermined amount of stroke away from the end face of the shaft.

Then, after the piston rod of the first cylinder is kept held in this condition, the piston rod of the third cylinder is retreated from the state in which it projects into the second cylinder, and the piston rod of the second cylinder is retreated axially rearwardly, thus sinking the guide sleeve into the seat as described above.

In addition, the guide sleeve can be stopped at a location a predetermined amount of stroke away from the reference surface, which is the end face of the shaft, by the restricting portion formed on the push rod. If the predetermined amount of stroke is set to be equal to the distance from the shaft end face to the edge of the bead-fitting portion closer to the shaft end face, the guide sleeve is stopped accurately at a point where its leading end mates with the edge even when the shaft is out of axial alignment. On the other hand, the jig body is continuously urged and moved axially forwardly, thereby causing the bead to be gradually pushed out forwardly of the guide sleeve through the seat. When the bead has been fully pushed out, the cylinder end of the second cylinder abuts against the piston of the second cylinder to stop the urged movement of the jig body and thus, the bead is reliably fitted over the bead-fitting portion.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 3(a) to 5(d) are views for explaining the operation of the apparatus;

FIG. 4 is a sectional side view of an essential portion of means for supplying and setting a boot on an assembling jig; and FIGS. 5(a) to 5(d) are views for explaining the operation of the means.

DETAILED DESCRIPTION OF PREFERRED EMBODIMENTS

Figure 1:
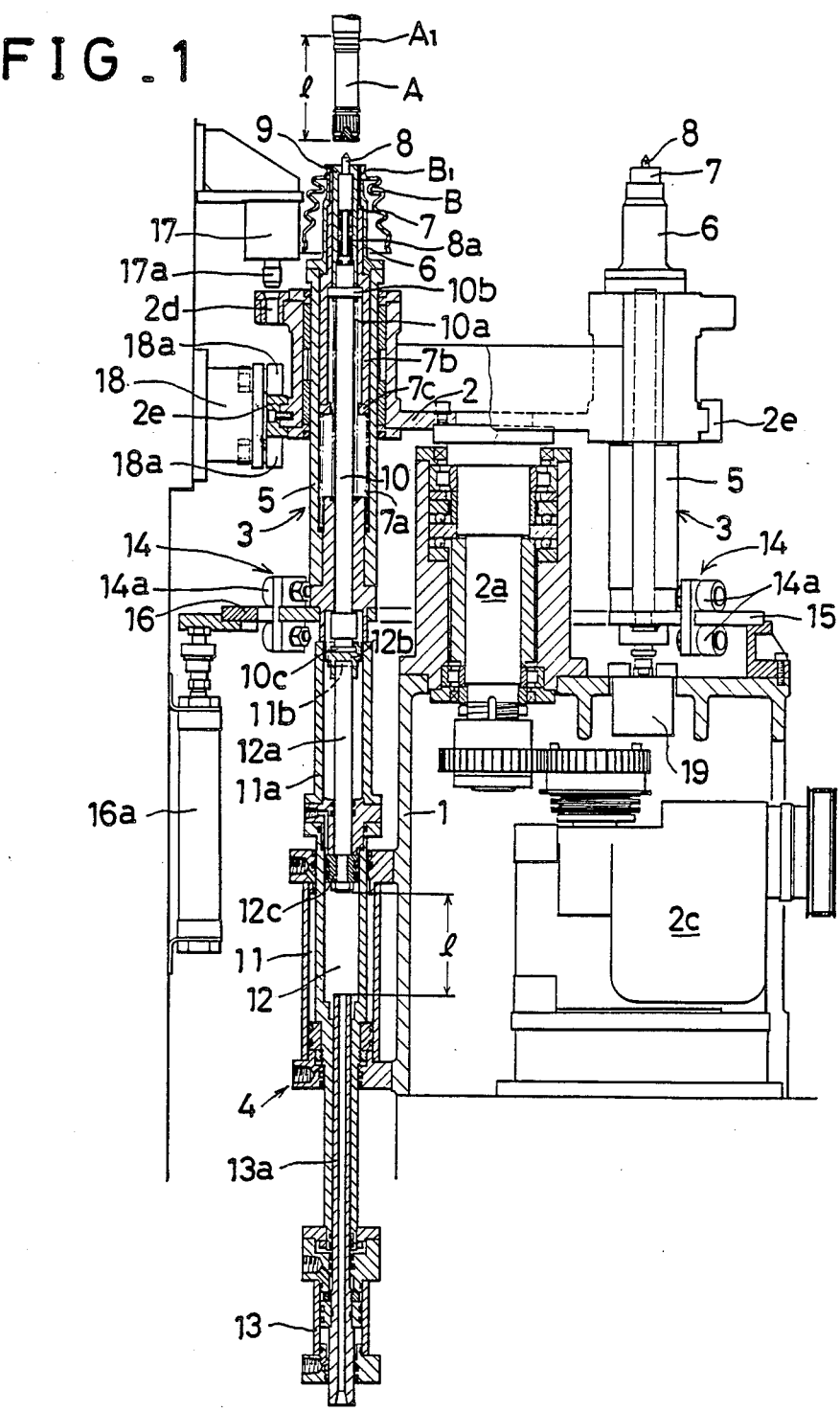
FIG. 1 is a sectional side view of an assembling apparatus according to one embodiment of the present invention.

Referring to the drawings, there is illustrated one embodiment of an assembling apparatus according to the present invention. The assembling apparatus is arranged such that, at an assembling station located along a conveying passage along which a driving shaft A is conveyed in its vertical posture, it assembles a rubber boot B to the driving shaft from therebelow for a joint unit while a bead B1 on the diametrically smaller end thereof is held to be upside.

Figure 2:
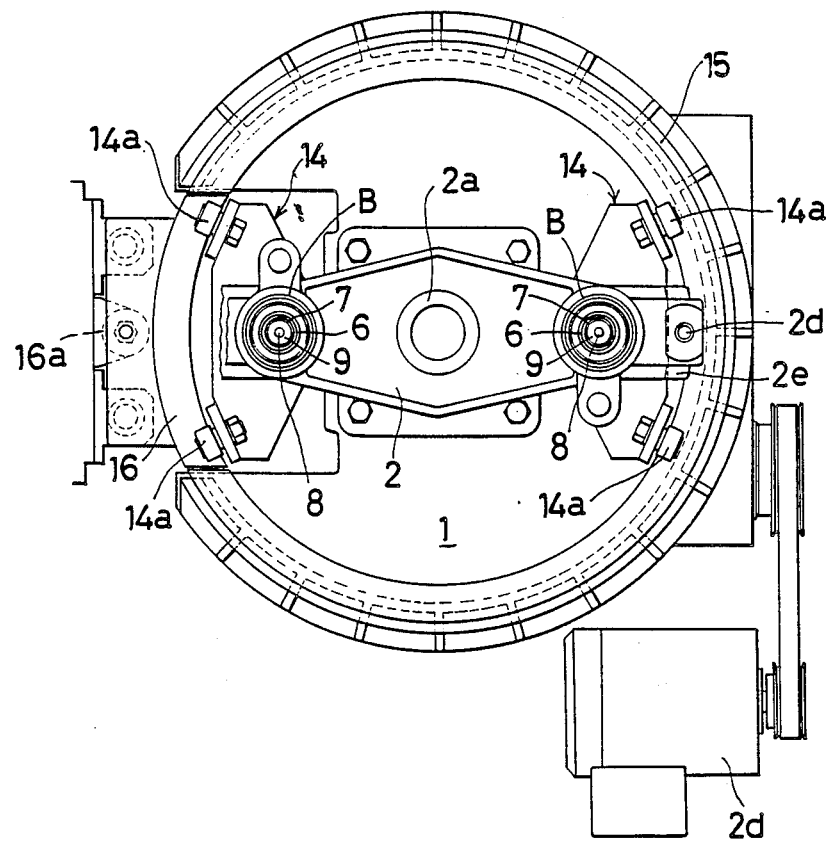
FIG. 2 is a plan view of the apparatus.

As shown in FIGS. 1 and 2, the assembling apparatus has a rotary table 2 pivotally supported through a vertical rotary shaft 2a on a base 1 mounted on the assembling station. A pair of assembling jigs 3 are suspended from the rotary table 2 and are disposed thereon having a phase difference of 180° from each other. The rotary table is index-rotated 180° at a time by a motor 2b through a reduction gear 2c, so that one and the other of the pair of assembling jigs are moved alternately to an assembling position right below a stop position of the driving shaft A and to a setting position located by the side of the stop position. A drive source for the assembling jigs is provided below the assembling position.

Each of the assembling jigs 3 includes a cylindrical jig body 5 inserted through the rotary table 2 and supported thereon as to be slidable along the axial direction of the driving shaft A, that is, a vertical direction. An annular seat 6 is provided on the upper end of the jig body 5 for receiving the lower end surface of the bead B1 of the boot B. A guide sleeve 7 is provided within the jig body 5 and is projectable upwardly of the annular seat 6 and urged by a spring 7a in the upward projecting direction thereof. A guide shaft 9 is inserted through the guide sleeve 7 and is movable downward with respect to the guide sleeve 7. The guide shaft 9 is provided with a center pin 8 which is engageable with a center hole in the lower end surface of the driving shaft A and erected so as to be sinkable thereinto against the force of a spring 8a. A push rod 10 urged upward by a spring 10a is additionally inserted through the jig body 5 so that a flange 10b on the upper end of the push rod 10 may hit the guide sleeve 7 and the guide shaft 9 from below, and the guide shaft 9 may be held urged to its fully pushed up position in which the upper end thereof is level with the upper end of the guide sleeve 7.

The guide sleeve 7 has a configuration so that it can be fitted over a lower end portion of the driving shaft A up to the fitting portion A1 for the bead B1 and further permits the bead B1 in a slightly diametrically expanded state to be fitted over the upper end portion thereof projecting upwardly of the seat 6. A cylindrical portion 7b extends from the lower end of said guide sleeve adapted to fit over the flange 10b of the push rod 10. A stopper ring 7c is attached to the lower end of the cylindrical portion 7b, whereby an upward stroke of the guide sleeve 7 relative to the push rod 10 is limited to a predetermined extent by engagement of the stopper ring 7c with the flange 10b.

The drive source 4 comprises a first cylinder 11 fixedly mounted on the base 1, a second cylinder 12 formed at an intermediate portion of a piston rod 11a, and a third cylinder 13 mounted on a lower end of the piston rod 11a. Thus, when the assembling jig 3 is moved to the assembling position, a lower end of the jig body 5 moves to a position to face an upper end of the piston rod 11a of the first cylinder 11 while an engaging element 12b mounted on an upper end of a piston rod 12a of the second cylinder 12 inserted through the piston rod 11a engages a connecting element 10c at a lower end of the push rod 10. Further, a piston rod 13a of the third cylinder 13 is projectable into the second cylinder 12. When the piston rod 13a is in the upwardly moved position, it comes to face a piston 12c of the second cylinder 12 located in the upwardly moved position, the distance from the piston 12c being equal to a distance between a lower end face of the drive shaft A and the fitting portion A1.

The engaging element 12b is shaped such that the connecting element 10c can be inserted thereinto and withdrawn therefrom in a direction of revolution of the assembling jig 3. Notches 11b permitting the passing of the connecting element 10c are provided on circumferential opposite sides of the upper end of the piston rod 11a.

A guide member 14 having a roller 14a is mounted on the lower end of the jig body 5 so that the jig body 5 may be engaged slidably, on the guide member 14, with an annular rail arrangement comprising a stationary rail 15 on the base 1 and a movable rail 16 closer to the assembling position and liftable by a cylinder 16a. Thus, when the assembling jig 3 is moved to the assembling position, the guide member 14 engages the movable rail 16. When the jig body 5 is pushed upward by the operation of the first cylinder 11 to assemble a boot B to the shaft A, the cylinder 16a is brought to an inoperative state to allow the movable rail 16 to move, following the jig body 5. After assembling, the contraction of the cylinder 16a causes the jig body 5 to be pulled down through the movable rail 16.

A positioning cylinder 17 includes a pin 17a capable of engaging a positioning hole 2d made in the vicinity of a location at which each assembling jig 3 of the rotary table 2 is disposed. With operation of the cylinder 17, the rotary table 2 can be reliably stopped at a predetermined rotated position where each assembling jig 3 is aligned with the assembling position. Further, a guide block 18 is provided below the cylinder 17 having rollers 18a mounted thereon for clamping, from above and below, a tongue piece 2e projecting from the rotary table 2 so that the guide block 18 can receive an urging force of the cylinder 17. A cylinder 19 operates to upwardly urge the push rod 10 of the assembling jig 3 located at a setting position in order to check the downward movement of the guide sleeve 7.

Description will now be made of a procedure for assembling a boot B by the assembling apparatus.

First, the boot B is set on the assembling jig 3 located at the setting position, so that the bead B1 thereof may be fitted over the guide sleeve 7 and the lower end face thereof may be seated on the seat 6. Then, the assembling jig 3 is moved to the assembling position to provide a condition as shown in FIG. 1. For this operation, the piston rod 11a of the first cylinder 11 is brought in advance into its lower position, and the respective piston rods 12a and 13a of the second and third cylinders 12 and 13 are also brought in advance into their upper positions.

Then, supplying of a fluid into a lower chamber in the second cylinder 12 through the piston rod 13a of the third cylinder 13 is stopped, and with the piston rod 13a maintained at its upper position by supplying a fluid into a lower chamber in the third cylinder 13, the fluid is supplied into a lower chamber in the first cylinder 11 to move the piston rod 11a upwardly thereof. This causes the jig body 5 to be pushed up through the piston rod 11a. The guide sleeve 7, the push rod 10 and the guide shaft 9 which are urged respectively by the springs 7a and 10a are moved upwardly following the jig body 5. As a result, the guide shaft 9 first abuts against the lower end face of the drive shaft A for the central pin 8 inserted in the guide shaft 9 to perform centering of the drive shaft A. Thereafter, the jig body 5 and the guide sleeve 7 are raised together while compressing the spring 10a and thus, the guide sleeve 7 is fitted over the end of the drive shaft A.

Figure 3:
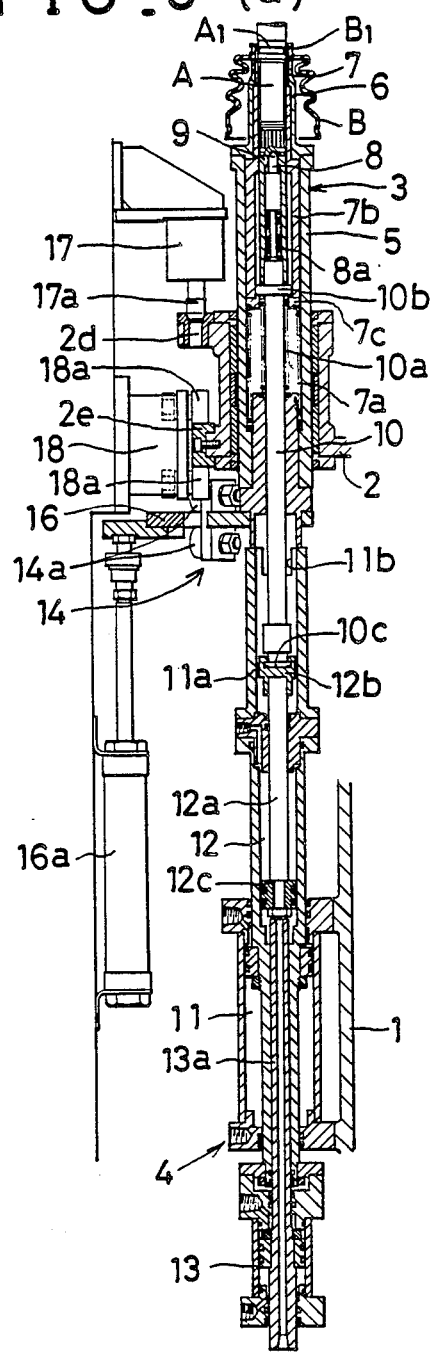
Figure 3:
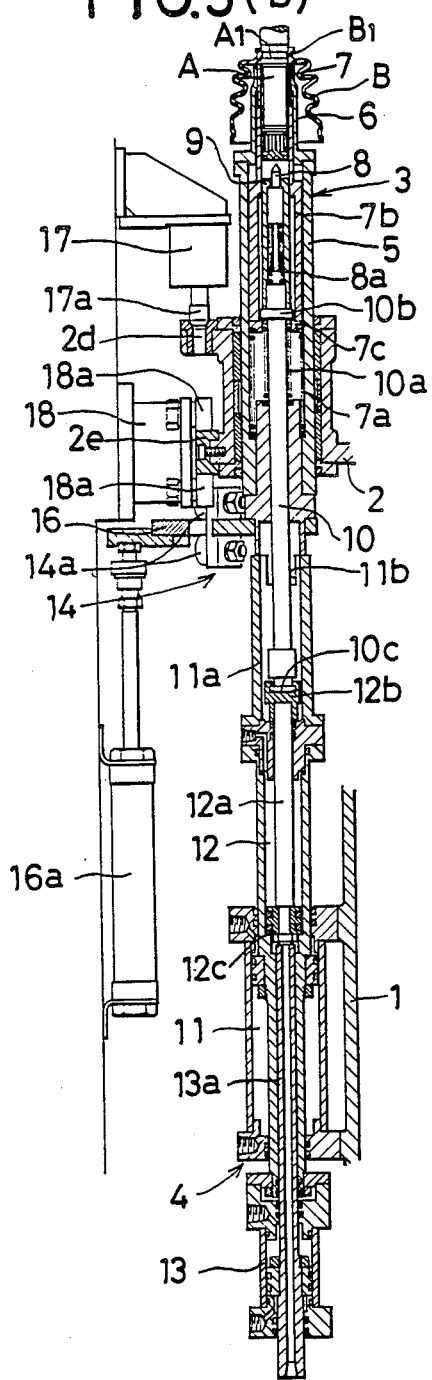

In this operation, with the guide shaft 9 abutting against the lower end face of the drive shaft A, a further upward movement of the piston rod 12a of the second cylinder 12 is restricted. Thereafter, the piston rod 11a of the first cylinder 11 is raised relative to the piston rod 12a, causing the piston rod 13a of the third cylinder 13 to gradually get closer to the piston 12c of the second cylinder 12 remaining stationary at a predetermined location with respect to the lower end face of the drive shaft A. When the guide sleeve 7 is raised by a predetermined amount of stroke from the lower end face of the drive shaft A until the upper end thereof reaches the fitting portion A1 as shown in FIG. 3(a), the piston rod 13a of the third cylinder 13 abuts against the piston 12c of the second cylinder 12 to restrict a further upward movement of the piston rod 11a of the first cylinder 11, and the stop ring 7c at the lower end of the guide sleeve 7 engages the flange 10b at the upper end of the push rod 10.

Then, the piston rod 11a of the first cylinder 11 is arrested by a suitable lock mechanism (not shown), and supplying of the fluid into the upper chamber in the second cylinder 12 and discharging of the fluid out of a lower chamber in the third cylinder 13 are effected. This permits the piston rod 12a of the second cylinder 12 to be moved downwardly and the guide sleeve 7 in turn is pulled down into the seat 6 through the flange 10b of the push rod 10 and withdrawn from the bead B1 of the boot B seated on the seat 6. Consequently, the bead B1 precisely fits over the fitting place A1 of the drive shaft A by its own resilient force.

Thereafter, the piston rod 11a of the first cylinder 11 is lowered, and the operation of the cylinder 16a causes the jig body 5 to be lowered through the movable rail 16, thus completing the assembling operation.

In the above embodiment, it is arranged such that the stop ring 7c may be caused to abut against the flange 10b of the push rod 10 when the piston rod 13a of the third cylinder 13 abuts against the piston 12c of the second cylinder 12. Alternatively, the stop ring 7c may be arranged to abut against the flange 10b at a location short, by a length of guide sleeve 7 projecting from the seat 6, of where the latter abutment takes place. In this case, when the upper end of the guide sleeve mates with the lower edge of the fitting portion A1, the raising movement of the sleeve 7 is stopped, and thereafter, the seat 6 is raised so much as the projecting length of the sleeve 7, so that the bead B1 is pushed out from the sleeve 7 to fit over the fitting portion A1.

In this case, the third cylinder 13 may be omitted, so that the piston 12c may abut against a piston seat at the lower end of the second cylinder 12 when the seat 6 has been raised so much as the projecting length of the sleeve 7.

As described above, the boot B can be automatically assembled to the drive shaft A by the assembling apparatus, but it is further desired to provide an automation of an operation for setting the boot B on the assembling jig 3 in order to materialize a further improvement in productivity. Therefore, in the present embodiment, the assembling apparatus includes, as shown in FIG. 4, holding means 20 for receiving a boot B delivered from a stocker (not shown) to a predetermined delivery position, and setting means 21 for receiving the boot B from the holding means 20 and setting it on the assembling jig 3 located at the setting position, thereby enabling the setting operation to be performed automatically.

The holding means 20 comprises a cylindrical member 20a for supporting the bead B1 of the boot B, and a guide pin 20b insertable into the bead B1 and so inserted in an upper portion of the cylindrical member 20a as to be movable downward against a spring 20c. The setting means 21 comprises a movable frame 21b vertically movable in a body 21a which is reciprocatively movable between the delivery position and the setting position and liftable, and a plurality of claw pieces 21d supported thereon and opened and closed by a push rod 21c.

Thus, after the body 21a is moved back to the delivery position, and with the claw pieces 21d closed as shown in FIG. 5(a), the body 21a is lowered, whereby the claw pieces 21d are inserted into the bead B1 held on the cylindrical member 20b of the holding means 20 while pushing the guide pin 20b down. Then, as shown in FIG. 5(b), the claw pieces 21d are opened to diametrically expand the bead B1 and in this condition, the body 21a is raised and moved to the setting position and then lowered, allowing the claw pieces 21d to abut against the upper end of the guide sleeve 7 of the assembling jig 3 located at the setting position, as shown in FIG. 5(c). The body 21a is further pushed down from this condition, so that the bead B1 is fitted over the guide sleeve 7 in the diametrically expanded state, as shown in FIG. 5(d).

In this case, the downward movement of the guide sleeve 7 is blocked by the cylinder 19 provided at the setting position, so that the guide sleeve is prevented from sinking into the seat 6 even when the claw pieces 21d come to abut thereagainst.

As apparent from the above description, the bead of the boot is fitted over the outer periphery of the guide sleeve projecting from the seat on the jig body, and the guide sleeve is fitted over the outer periphery of the shaft, whereby the bead can be carried up to the predetermined fitting portion of the shaft without any sliding movement relative to the shaft. The guide sleeve can be pulled off from the bead as it sinks into the seat. Thus, the bead can be reliably fitted over the fitting portion. This prevents otherwise possible assembling error due to an entanglement with the bead. Further, the guide shaft allows the shaft to be automatically centered relative to the assembling jig, so that the guide sleeve can be smoothly fitted over the shaft. Moreover, the guide sleeve can be made to project from, and sink into, the seat by the second cylinder incorporated in the piston rod of the first cylinder which is the drive source for the jig body. Accordingly, the drive sources for the jig body and the guide sleeve can be integrated into one for a reduction in size and a simplification in structure of the assembling jig. In addition, the boot can be automatically precisely assembled to the predetermined portion of the shaft even when the axial positional misalignment of the shaft occurs. This is effective in remarkably reducing the occurrence frequency of assembling errors.

It is readily apparent that the above-described invention has the advantage of wide commercial utility. It should be understood that the specific form of the invention hereinabove described is intended to be representative only, as certain modifications within the scope of these teachings will be apparent to those skilled in the art.

What is claimed is:

1. A boot assembling apparatus for assembling a boot to a driving shaft, said boot provided at its leading end with a bead adapted to fit over the shaft, comprising:

an assembling jig positioned to be axially aligned with the driving shaft and having a jig body movable toward and away from the driving shaft in an axial direction of the driving shaft;

a seat mounted on a leading end of said jig body for receiving an inner end face of the bead of the boot;

a guide sleeve mounted in the jig body and projectable forwardly of said seat, said guide sleeve being normally retained forcibly in a state in which it remains projecting forwardly of the seat for a predetermined length approximately equal to a length of the bead, said guide sleeve being shaped to be fitted over the driving shaft and into the bead of the boot;

a guide shaft mounted in said guide sleeve and slidable axially rearwardly relative to said guide sleeve, said guide shaft being shaped to abut against and center an end face of the driving shaft for centering the driving shaft;

a push rod inserted in said jig body for urging said guide shaft axially forwardly, and provided with a restricting portion for restricting a axially forward sliding stroke of said guide sleeve to a predetermined extent;

a first cylinder for urging said jig body axially forwardly; and a second cylinder mounted on a piston rod of said first cylinder, so that said push rod is reciprocated by the operation of said second cylinder.

2. A boot assembling apparatus according to claim 1, wherein a third cylinder is attached to the piston rod of said first cylinder and is located axially rearwardly of said second cylinder, a piston rod of said third cylinder being projectable into said second cylinder, so that the axially forward moving stroke of the piston rod of said first cylinder relative to the piston of said second cylinder may be restricted to a predetermined extent by abutment of the piston rod of said third cylinder against said piston.

3. A boot assembling apparatus according to claim 1, wherein the axially forward moving stroke of the piston rod of said first cylinder relative to the piston of said second cylinder is restricted to a predetermined extent by abutment of an axially rear cylinder end of said second cylinder against said piston and said restricting portion is so arranged that the axially forward sliding stroke of said guide sleeve relative to said guide shaft may be shorter than said moving stroke by said predetermined length of guide sleeve projecting from said seat.

* * * * *